July 30, 1929.  T. E. HENTZ  1,722,747
COTTON HARVESTER
Filed July 28, 1927   3 Sheets-Sheet 1

INVENTOR.
T. E. Hentz
BY
ATTORNEY.

Patented July 30, 1929.

1,722,747

UNITED STATES PATENT OFFICE.

THOMAS E. HENTZ, OF POMARIA, SOUTH CAROLINA.

COTTON HARVESTER.

Application filed July 28, 1927. Serial No. 209,060.

This invention relates to new and useful improvements in harvesters, and particularly to cotton harvesters.

One object of the invention is to provide a machine which will more effectively remove the bolls from the plants, and deliver same to a suitable receptacle associated with said machine, and moving therewith.

Another object is to provide a machine of this character wherein the cotton bolls are crushed, while still on the standing plants, to such an extent that when a strong blast of air is directed against the plants, the bolls will be completely separated from the plants and be conveyed into the receptacle, which travels with the machine.

Other objects and advantages will be apparent from the following description when taken in connection with the accompanying drawings.

In the drawings:

Figure 4 is a horizontal sectional view on the line 4—4 of Figure 2.

Figure 1:
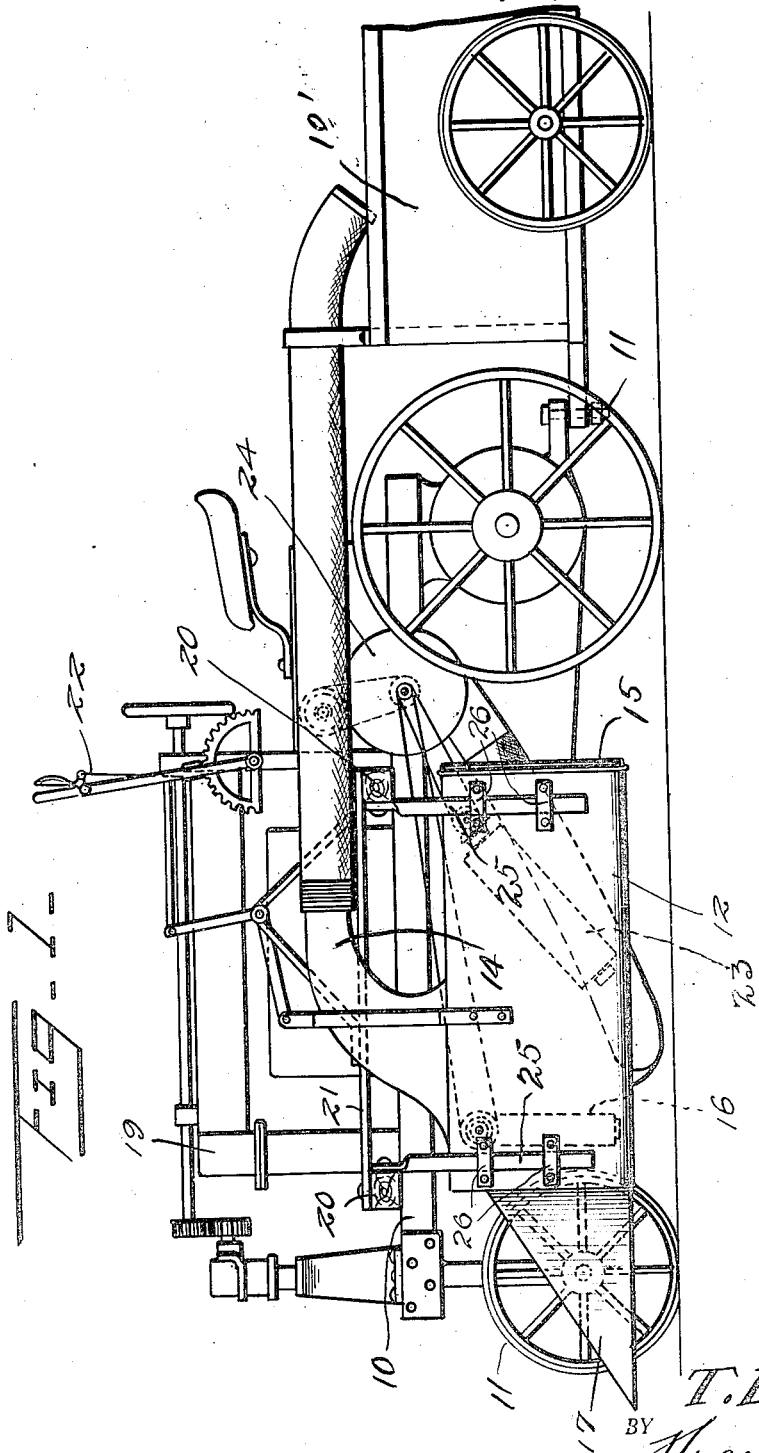
Figure 1 is a side elevation of a cotton harvester made in accordance with the present invention.
Figure 2:
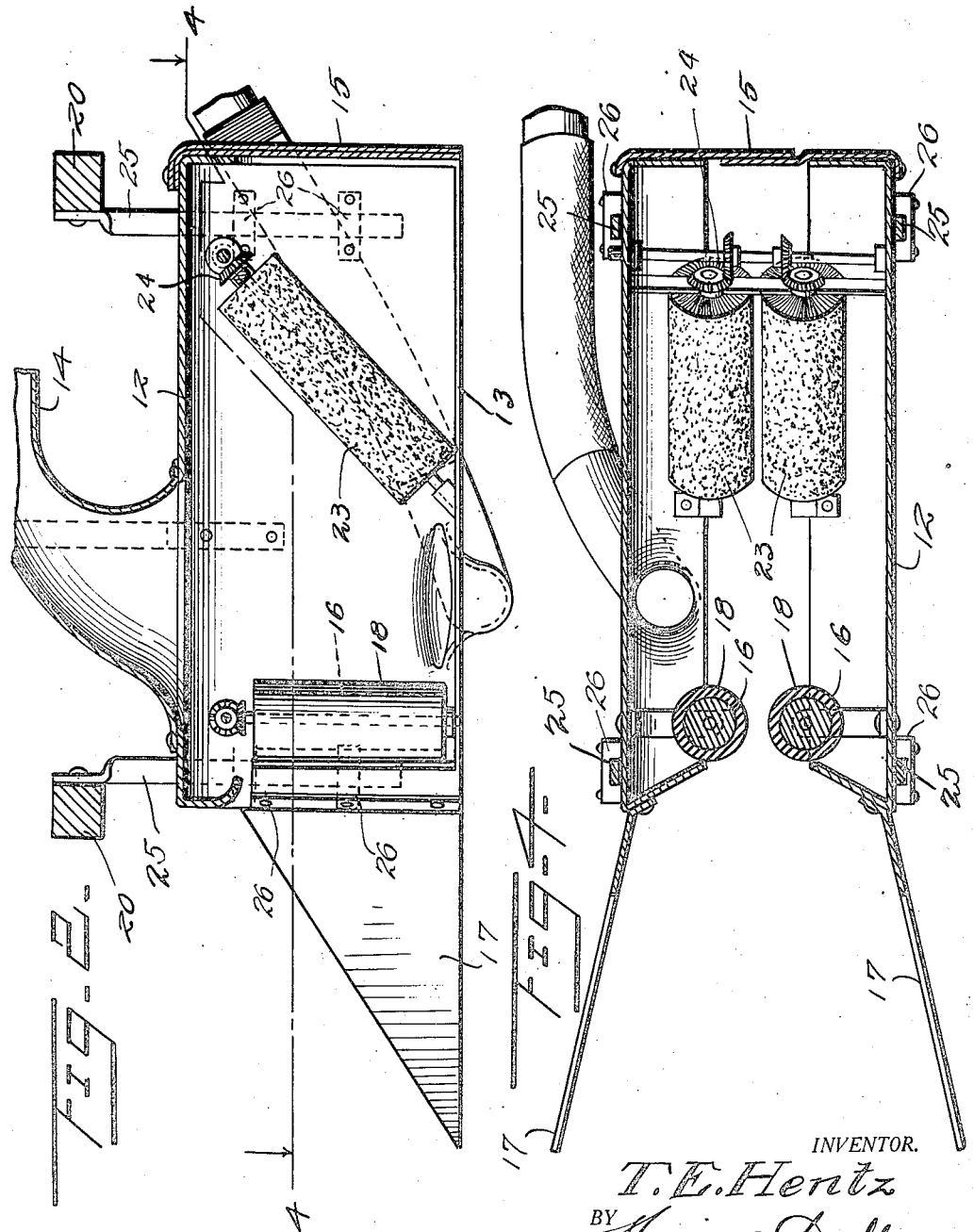
Figure 2 is a vertical longitudinal central sectional view taken on the line 2—2 of Figure 3.
Figure 3:
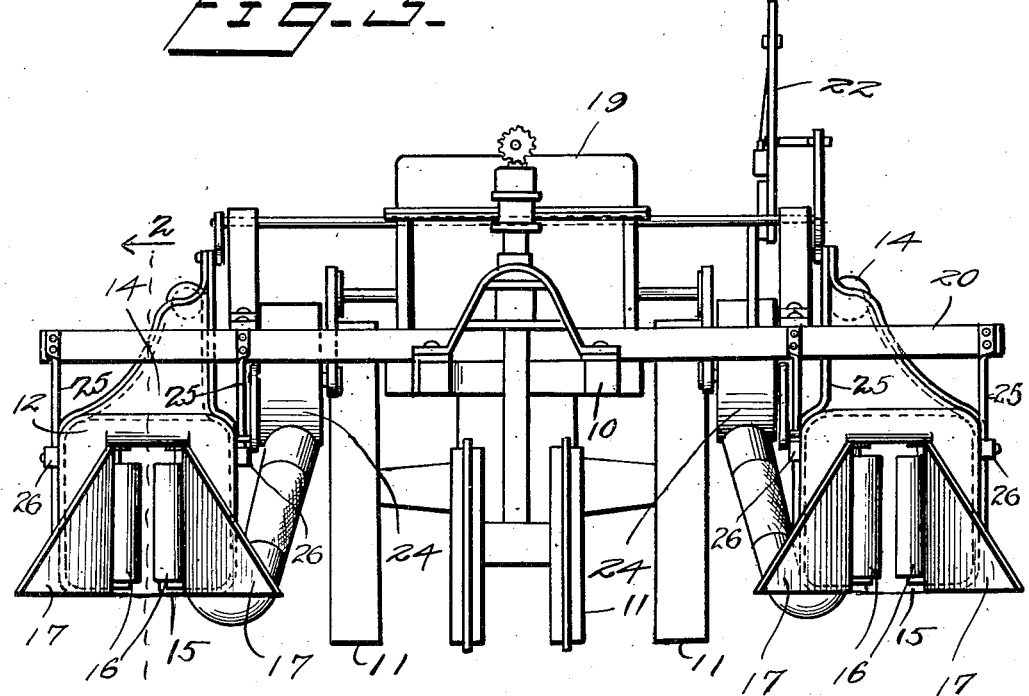
Figure 3 is a front elevation of the machine.
Figure 5:
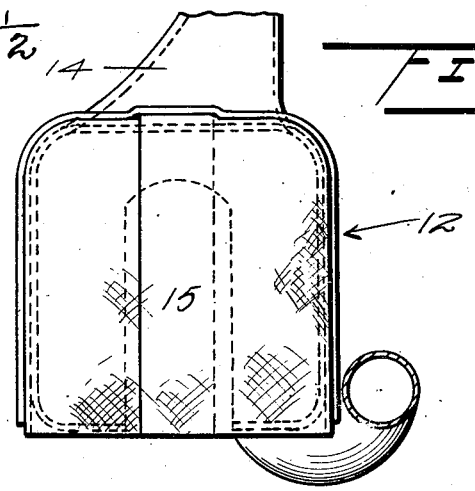
Figure 5 is a rear elevation of one of the casings showing the arrangement of the closure flaps.

Referring particularly to the accompanying drawings, 10 represents the frame of a tractor, having the ground wheels 11. Disposed at each side of the frame 10, and extending longitudinally thereof, is a substantially tubular casing, said casing having its forward and rear ends open, and having a slot 13, extending throughout the entire length of the lower side thereof. Connected to the upper side of the casing 12 is a pipe 14, which extends rearwardly in position to discharge into the wheeled cart 10', which is connected to the rear end of the tractor. In the rear end of the casing 12 there are mounted the closure flaps 15, which are pushed apart by the plants, as said plants pass outwardly through the said rear end of the casing. In the front end of the casing there are mounted the vertical parallel rollers 16, which are spaced apart a short distance, for passage of the standing cotton plants therebetween. The spacing of these rollers is such that the plants may readily pass therebetween, but that the cotton bolls will be so crushed that when the air blast strikes them they will be torn from the plants, and carried by the air current out through the pipe 14, and into the cart 10'. Mounted on the forward end of each casing 12, and diverging forwardly from the rollers 16, are the guards or gatherers 17, which serve to guide the plants to the rollers. The rollers 16 are preferably covered with rubber, as shown at 18, in Figure 4. While the rollers are spaced at the proper distance to crush the cotton bolls, they are sufficiently far apart to prevent crushing the seeds, within the bolls.

It will be particularly noted that there are two of the casings 12, and the associated devices, one being arranged on each side of the tractor, and properly supported on the ends of the transverse beams 20, which are secured across the tractor frame, and braced at 21, whereby the machine is capable of removing the cotton bolls from two adjacent rows of standing plants. The casings are adapted to be raised and lowered by means of the operating lever 22, carried on the tractor, and within convenient reach of the operator, on the tractor. The casings 12 are guided, in their vertical movements by the rods 25, and the straps 26.

Mounted within the rear end of each of the casings 12 are the upwardly and rearwardly inclined, and parallel brushes 23, each provided with steel wire bristles, whereby the plants which have passed between the rollers 16, and been practically stripped of the bolls, and such bolls removed from the plants by the air blast will pass between the said brushes and such bolls as have not been removed by the air blast, removed by said brushes. These brushes are intergeared, at 24, for unitary rotation, and are driven from the same source as that which drives the fan and rollers.

What is claimed is:

1. A cotton harvester including a casing arranged to be passed over standing cotton plants of a row, means in the casing for partially separating the bolls from the plants, means for subsequently directing a strong blast of air against the plants to completely remove the bolls therefrom, and means for removing those bolls which escaped removal by the air blast.

2. A cotton harvester including an elongated casing arranged to be passed over the standing plants of a row, means in the casing for crushing the bolls on the plants, means for directing an air blast against the plants whereby to remove the crushed bolls from the plants, and brushes in the casing, between which the plants pass, for removing crushed bolls not detached by the air blast.

3. A cotton harvester including an elongated casing having a longitudinal slot in its lower side through which the standing cotton plants are adapted to pass, crushing rollers in one end of the casing for crushing and partially separating the cotton bolls from the plants, a conduit leading from the casing, means for directing a strong blast of air against the plants whereby to completely separate the bolls therefrom and force them through said conduit, and means in the casing, rearwardly of the crushing rollers, for stripping from the plants those bolls which escaped removal by the air blast, and delivering such boils to the air blast.

In testimony whereof, I affix my signature.

THOS. E. HENTZ.